United States Patent Office 3,278,373
Patented Oct. 11, 1966

3,278,373
STABILIZED 3,3' - ETHYLENEBIS(TETRAHYDRO-4,6 - DIMETHYL - 2H - 1,3,5 - THIADIAZENE-2-THIONE) FUNGICIDAL COMPOSITION
Harris M. Baker, Glen Farms, Md., assignor to E. I. du Pont de Nemours and Company, Wilmington, Del., a corporation of Delaware
No Drawing. Filed May 7, 1963, Ser. No. 278,757
11 Claims. (Cl. 167—33)

This invention relates to the compound 3,3'-ethylenebis (tetrahydro - 4,6-dimethyl-2H-1,3,5-thiadiazine-2-thione), useful as a fungicide.

Although the compound identified above is an excellent fungicide, as described in U.S. Patent No. 3,085,046, according to the present invention I have found that this compound is somewhat unstable under extreme storage conditions. Upon prolonged storage, particularly at elevated temperatures, the amount of fungicidally active thiadiazine decreases.

I have found that the shelf-life of the thiadiazine referred to above can be increased significantly by admixing with the thiadiazine from 0.25% to about 20% by weight of sodium sulfate, calcium sulfate, magnesium sulfate, zinc sulfate, aluminum sulfate, calcium oxide or barium oxide. Alumina gel or silica gel can also be used. Mixtures of these compounds can be used.

Although even very small amounts of one of these compounds admixed with the thiadiazine has beneficial effect upon shelf-life, the amount used will ordinarily be above 0.25% and preferably above 0.5% by weight based on the weight of the thiadiazine. Ordinarily, an amount below 20% and preferably below about 5% by weight will be used.

Besides improving the shelf-life of the active fungicidal ingredient, the additives of this invention have the advantages of being non-corrosive and relatively inexpensive. In addition, at the rates utilized, they do not introduce toxicity problems and generally are compatible with convenitonal formulating ingredients.

The above additives can be combined with the thiadiazine by conventional mixing. The order of addition is not critical. These mixtures can then be ground in conventional milling equipment to reduce the particle size of the fungicidal powder.

In addition to the thiadiazine and the additive of this invention, there can also be admixed, if desired, a surface-active agent which can be of the anionic, cationic or non-ionic types. Additionally, when formulated for fungicidal application, compositions of this invention can optionally contain one or more conventional pesticidal adjuvants such as diluents, anti-foaming agents, anti-dusting agents, dyes, etc. Additionally, plant nutrients or fertilizers can be included if desired.

Similarly, the compositions of this invention can if desired also contain other fungicides (such as ferbam, maneb, zineb, ziram, thiram and other dithiocarbamates, or captan, phaltan, etc.) or insecticides (such as DDT, methoxychlor, phosphorus insecticides, carbamate insecticides, etc.).

This invention will be better understood by reference to the following illustrative examples, in which parts and percentages are by weight unless otherwise indicated:

Example 1

The following composition is prepared by simple admixture of the following components:

| | Parts |
|---|---|
| 3,3' - ethylenebis(tetrahydro - 4,6-dimethyl-2H-1,3,5-thiadiazine-2-thione) | 99 |
| $Na_2SO_4$ | 1 |

This composition has a markedly longer shelf-life with retention of excellent fungicidal activity, by comparison with a sample of an equal amount of the thiadiazine alone, as measured by chemical analysis of the amount of fungicidally active thiadiazine remaining after an extended storage period.

Example 2

A composition is prepared by mixing the following components and then grinding the mixture in a fluid energy mill until the average particle size of the product is less than 10 microns:

| | Percent |
|---|---|
| 3,3' - ethylenebis(tetrahydro-4,6-dimethyl-2H-1,3,5-thiadiazine-2-thione) | 50 |
| $Na_2SO_4$ | 0.5 |
| Sodium lignin sulfonate | 1.0 |
| Kaolin clay | 47.0 |
| $CaSO_4$ | 1.5 |

This composition has a markedly increased shelf-life when compared with an identical composition which does not contain the calcium sulfate ingredient, as measured by chemical analysis of the amount of fungicidally active thiadiazine remaining after an extended storage period.

Example 3

A wettable powder is prepared by simple admixture of the following ingredients and then grinding the mixture:

| | Percent |
|---|---|
| 3,3' - ethylenebis(tetrahydro-4,6-dimethyl-2H-1,3,5-thiadiazine-2-thione | 80 |
| Alkyl naphthalene sulfonic acid, sodium salt | 0.75 |
| Low viscosity methyl cellulose | 0.25 |
| Synthetic fine silica | 18.5 |
| Calcium oxide | 0.5 |

This composition which is an excellent fungicide has a markedly increased shelf-life when compared with an identical composition which does not contain the calcium oxide ingredient, as measured by chemical analysis of the amount of fungicidally active thiadiazine remaining after an extended storage period.

Example 4

A fungicidal dust composition is prepared by simple admixture of the following ingredients:

| | Percent |
|---|---|
| 3,3' - ethylenebis(tetrahydro - 4,6-dimethyl-2H-1,3,5-thiadiazine-2-thione) | 20 |
| Stearated calcium carbonate | 75 |
| Barium oxide | 5 |

This composition has a markedly increased shelf-life when compared with an identical composition which does not contain the barium oxide ingredient, as measured by chemical analysis of the amount of fungicidally active thiadiazine remaining after an extended storage period.

Example 5

A dust composition is prepared from the following components:

| | Percent |
|---|---|
| 3,3' - ethylenebis(tetrahydro - 4,6-dimethyl-2H-1,3,5-thiadiazine-2-thione) | 25 |
| Pyrophyllite | 53 |
| Attapulgite clay | 6 |
| $MgSO_4$ | 16 |

The thiadiazine, $MgSO_4$ and the attapulgite are first blended, and are then ground in a fluid energy mill. This dust concentrate is then diluted by simple blending with the pyrophyllite. The composition has a markedly increased shelf-life when compared with an identical composition which does not contain the magnesium sulfate ingredient, as measured by chemical analysis of the amount of fungicidally active thiadiazine remaining after an extended storage pediod.

*Example 6*

A fungicidal dust composition is prepared from the following components by blending and grinding:

| | Percent |
|---|---|
| 3,3' - ethylenebis(tetrahydro - 4,6-dimethyl-2H-1,3,5-thiadiazine-2-thione) | 20 |
| Tobacco dust | 70 |
| Silica gel | 10 |

This composition has a markedly increased shelf-life when compared with an identical composition which does not contain the silica gel ingredient, as measured by chemical analysis of the amount of fungicidally active thiadiazine remaining after an extended storage period.

*Example 7*

A wettable powder composition is prepared by blending and grinding the following ingredients:

| | Percent |
|---|---|
| 3,3' ethylenebis(tetrahydro-4,6-dimethyl-2H-1,3,5-thiadiazine-2-thione) | 80 |
| Alkyl naphthalene sulfonic acid, sodium salt | 0.75 |
| Low viscosity methyl cellulose | 0.25 |
| Diatomaceous earth | 11 |
| Alumina gel | 8 |

This composition has a markedly increased shelf-life when compared with an identical composition which does not contain the alumina gel ingredient, as measured by chemical analysis of the amount of fungicidally active thiadiazine remaining after an extended storage period, and remains an excellent fungicide during and after such period.

*Example 7*

A wettable powder formulation is prepared from the following ingredients:

| | Percent |
|---|---|
| 3,3' - ethylenebis(tetrahydro - 4,6-dimethyl-2H-1,3,5-triadiazine-2-thione) | 85 |
| Dioctyl sodium sulfosuccinate concreted with sodium benzoate | 3 |
| Partially desulfonated sodium lignin sulfonate | 3 |
| $Na_2SO_4$ | 2 |
| Diatomaceous earth | 7 |

This formulation is prepared by thoroughly blending the ingredients and grinding the mixture in an air attrition mill until the average particle size is less than 5 microns. This composition has a significantly increased shelf-life when compared with an otherwise identical composition which does not contain the sodium sulfate ingredient, as measured by chemical analysis of the amount of fungicidally active thiadiazine remaining after an extended storage period.

The invention claimed is:

1. A fungicidal composition of prolonged shelf-life comprising 3,3'-ethylenebis(tetrahydro-4,6-dimethyl-2H-1,3,5-thiadiazine-2-thione) and a compound selected from the group consisting of sodium sulfate, calcium sulfate, magnesium sulfate, zinc sulfate, aluminum sulfate, calcium oxide, barium oxide, silica gel and alumina gel, said compound being present in an amount from 0.25% to 20% by weight based on the weight of said thiadiazine.

2. The composition as set forth in claim 1 wherein said compound is present in an amount from about 0.5% to 5%.

3. The composition as set forth in claim 2 wherein said compound is sodium sulfate.

4. The composition as set forth in claim 2 wherein said compound is calcium sulfate.

5. The composition as set forth in claim 2 wherein said compound is magnesium sulfate.

6. The composition as set forth in claim 2 wherein said compound is zinc sulfate.

7. The composition as set forth in claim 2 wherein said compound is aluminum sulfate.

8. The composition as set forth in claim 2 wherein said compound is calcium oxide.

9. The composition as set forth in claim 2 wherein said compound is barium oxide.

10. The composition as set forth in claim 2 wherein said compound is silica gel.

11. The composition as set forth in claim 2 wherein said compound is alumina gel.

References Cited by the Examiner

UNITED STATES PATENTS

| | | | |
|---|---|---|---|
| 2,592,540 | 4/1952 | Cassil et al. | 167—42 |
| 2,797,181 | 6/1957 | Drexel | 167—42 |
| 2,848,297 | 8/1958 | Hill | 167—42 |
| 3,085,046 | 4/1963 | Cummins | 167—33 |

JULIAN S. LEVITT, *Primary Examiner.*

GEORGE A. MENTIS, *Assistant Examiner.*